United States Patent
Schulz et al.

(10) Patent No.: US 6,841,969 B1
(45) Date of Patent: Jan. 11, 2005

(54) FLUX OBSERVER IN A SENSORLESS CONTROLLER FOR PERMANENT MAGNET MOTORS

(75) Inventors: Steven E. Schulz, Torrance, CA (US); Nitinkumar R. Patel, Cypress, CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/669,918

(22) Filed: Sep. 24, 2003

(51) Int. Cl.[7] .................................................. H02P 6/18
(52) U.S. Cl. ...................... 318/807; 318/254; 318/138; 318/439; 318/610; 318/799
(58) Field of Search ................. 318/254, 138, 318/439, 610, 799, 700, 807

(56) References Cited

U.S. PATENT DOCUMENTS

| | | | | |
|---|---|---|---|---|
| 5,903,129 A | * | 5/1999 | Okuno et al. ............... | 318/721 |
| 6,462,491 B1 | * | 10/2002 | Iijima et al. ................ | 318/254 |
| 6,492,788 B1 | * | 12/2002 | Agirman et al. ............ | 318/700 |
| 2002/0149331 A1 | * | 10/2002 | Marcinkiewicz ............ | 318/254 |
| 2004/0007995 A1 | * | 1/2004 | Fu .............................. | 318/254 |

* cited by examiner

*Primary Examiner*—Rita Leykin
(74) *Attorney, Agent, or Firm*—Christopher DeVries

(57) ABSTRACT

A control system includes a field oriented controller that receives a torque command and that generates phase voltages for an electric machine. A first transformation module receives stator terminal currents and generates d-axis and q-axis stationary frame currents. An open loop flux observer receives d-axis and q-axis stationary frame voltage commands and the d and q-axis stationary frame currents. The open loop flux observer includes a vector cross product calculator that generates an error signal that is proportional to an angular difference between an estimated stator flux and a computed stator flux and a proportional integral controller that generates an estimated rotor angular position based on the error signal. A second transformation module receives the d-axis and q-axis stationary frame currents and the estimated rotor angular position and generates d-axis and q-axis synchronous reference frame feedback currents that are output to the field oriented controller.

18 Claims, 7 Drawing Sheets

FLUX OBSERVER IN A SENSORLESS CONTROLLER FOR PERMANENT MAGNET MOTORS

FIELD OF THE INVENTION

The present invention relates to electric machines, and more particularly to sensorless rotor position estimation for electric machines.

BACKGROUND OF THE INVENTION

Open-loop flux observers are used to estimate rotor position in an electric machine such as a permanent magnet (PM) motor. The open-loop flux observer is typically called a "sensorless" estimator because the rotor position is inferred rather than measured directly. Direct rotor position sensors typically include rotor position transducers (RPTs) or other sensors that sense movement of the rotor. Direct rotor position sensors are typically costly to implement and may tend to reduce the reliability of the electric machine.

The open-loop flux observer estimates rotor position using stator currents and commanded stator voltages as inputs. The open-loop flux observer calculates the back EMF of the electric machine. There are several characteristic equations that are used:

$$\Psi_{dqs}^s = \int (V_{dqs}^{s*} - R_s \cdot i_{dqs}^s) dt \quad (1)$$

$$\theta_{\Psi s} = \tan^{-1}\left(\frac{\Psi_{qs}^s}{\Psi_{ds}^s}\right) \quad (2)$$

$$\delta = \tan^{-1}\left(\frac{\Psi_{qs}^e}{\Psi_{ds}^e}\right) = \tan^{-1}\left(\frac{L_q \cdot i_{qs}^e}{\Psi_f + L_d \cdot i_{ds}^e}\right) \quad (3)$$

$$\theta_r = \theta_{\Psi s} - \delta \quad (4)$$

Where $\Psi_{dqs}^s$ is the stator flux linkage in the stationary reference frame, $i_{dqs}^s$ is the stator current in the stationary reference frame, $R_s$ is the stator resistance, $\Psi_{ds}^s$ and $\Psi_{qs}^s$ are the d-axis and q-axis stator flux linkages in the stationary reference frame, $\Psi_{ds}^e$ and $\Psi_{qs}^e$ are the d-axis and q-axis stator flux linkages in the stationary reference frame, $\Psi_f$ is the permanent magnet flux linkage, $L_d$ is the d-axis inductance, $L_q$ is the q-axis inductance, $i_{ds}^e$ and $i_{qs}^e$ are synchronous reference frame currents, $\theta_r$ is the rotor position, $\theta_{\Psi s}$ is the angular position of the stator flux and $\delta$ is the load angular position.

The back EMF is integrated to obtain the stator flux linkage in a stationary reference frame (See Equation 1). The angular position of the stator flux is usually obtained using the arctangent function (See Equation 2). The rotor position information is obtained by subtracting the load angular position $\delta$ (See Equation 3) from the stator flux position (See Equation 4).

In most implementations, however, an integration function that is set forth in Equation 1 is not used. Cascaded low pass filters (LPF) are typically used to simulate the integration function to avoid integration problems that occur at low stator frequencies. Cascaded LPFs also provide improved transient response as compared to a single LPF since faster time constants can be used.

The conventional open-loop flux observer has several performance problems. The cascaded LPFs require electrical speed data, which is not normally available from basic open-loop observers. The electrical speed data is used to set the LPF coefficients. To generate the electrical speed data, a derivative of angular position is generated. The derivative operation tends to be noise sensitive and can create errors in the electrical speed data. The electrical speed data is used to compute the coefficients of the cascade LPFs. Errors in the electrical speed data adversely impact LPF characteristics such as gain and phase and may cause instability. Also, the conventional open-loop flux observer requires an arctangent function, which can be computationally intensive.

SUMMARY OF THE INVENTION

A control system includes a field oriented controller that receives a torque command and that generates phase voltages for an electric machine including a rotor and a stator. A first transformation module receives stator terminal currents and generates d-axis and q-axis stationary frame currents. An open loop flux observer receives d-axis and q-axis stationary frame voltage commands and the d and q-axis stationary frame currents. The open loop flux observer includes a vector cross product calculator that generates an error signal that is proportional to an angular difference between an estimated stator flux and a computed stator flux and a proportional integral controller that generates an estimated rotor angular position based on the error signal. A second transformation module receives the d-axis and q-axis stationary frame currents, and the estimated rotor angular position and generates d-axis and q-axis synchronous reference frame feedback currents that are output to the field oriented controller.

In other features, the electric machine is a permanent magnet electric machine. The open loop flux observer includes a d-axis voltage drop calculator that calculates a d-axis stator voltage drop due to stator resistance. A q-axis voltage drop calculator calculates a q-axis stator voltage drop due to the stator resistance. A first summer generates a d-axis back EMF by calculating a first difference between the d-axis stationary frame voltage command and the d-axis stator voltage drop. A second summer generates a q-axis back EMF by calculating a second difference between the q-axis stationary frame voltage command and the q-axis voltage drop.

In still other features, the open loop flux observer includes a first low pass filter that receives an electrical angular velocity estimate and the d-axis back EMF and that generates a d-axis stator flux linkage value. A second low pass filter receives the electrical angular velocity estimate and the q-axis back EMF and generates a q-axis stator flux linkage value.

In yet other features, the vector cross product calculator includes a sine function generator that generates a sine value of an estimated stator flux angular position. A cosine function generator generates a cosine value of the estimated stator flux angular position. A first multiplier multiplies the sine value by the d-axis stator flux value. A second multiplier multiplies the cosine value by the q-axis stator flux value. A first difference circuit generates an error signal that is based on a difference between the two products, which is also the cross product.

In other features, the open loop flux observer further includes a load angular position circuit that generates a load angular position. A derivative calculator calculates a derivative of the load angular position. A summing circuit generates a stator flux angular velocity by summing the load angular position derivative and the estimated electrical angular velocity. An integrator integrates the stator flux angular velocity to generate a stator flux position. A second difference circuit generates the estimated angular rotor position based on a difference between the stator flux position and the load angular position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
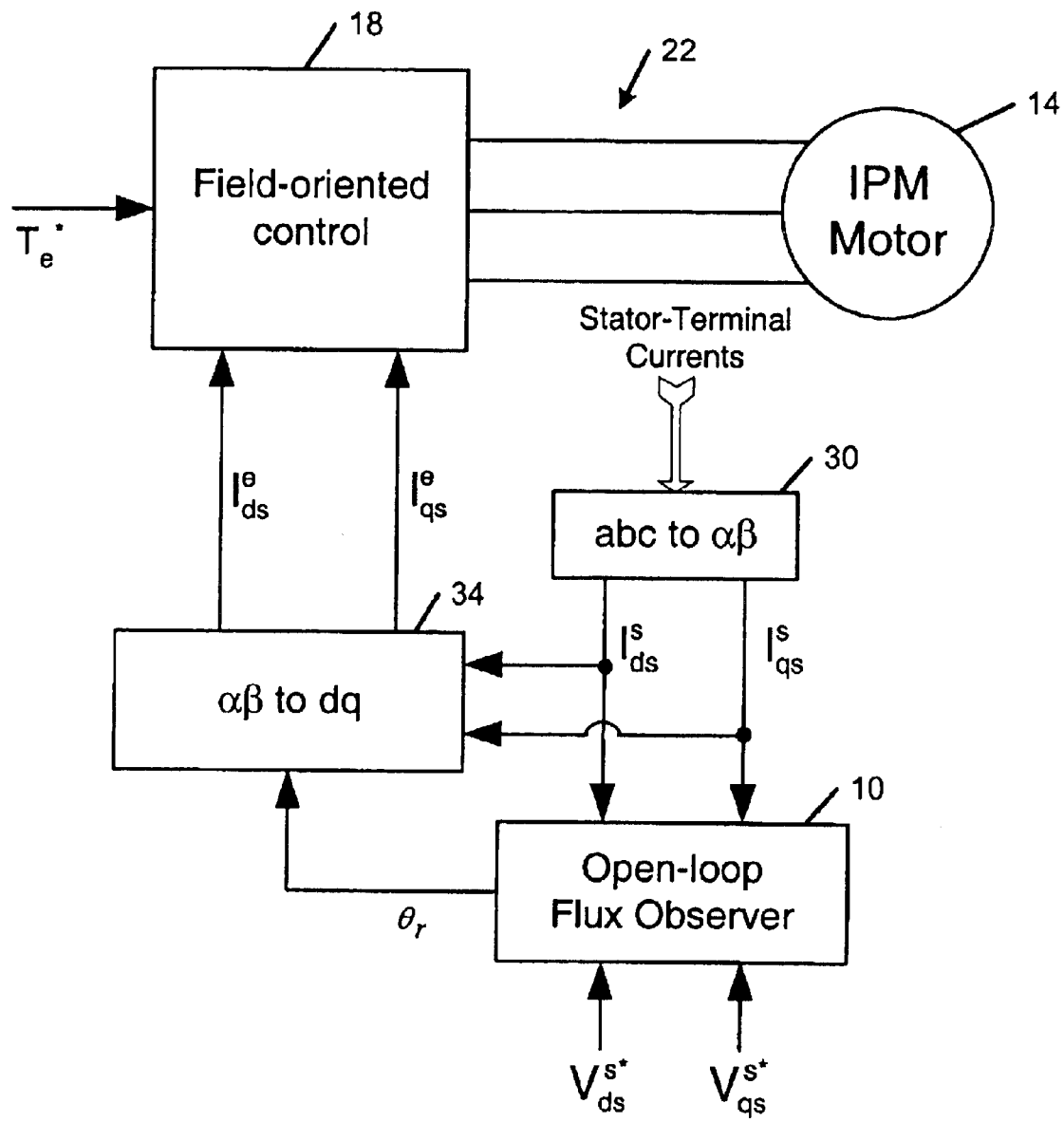
FIG. 1 is a functional block diagram of an open-loop flux observer circuit according to the present invention and a sensorless drive circuit.

The following description of the preferred embodiment(s) is merely exemplary in nature and is in no way intended to limit the invention, its application, or uses. For purposes of clarity, the same reference numbers will be used in the drawings to identify the same elements.

The present invention eliminates several problems that are associated with conventional open-loop flux observers. In particular, the present invention replaces the arctangent function using a vector cross product (VCP) error function and a proportional integral (PI) controller. The open-loop flux observer circuit according to the present invention provides smooth speed estimation data that can be used by the cascade LPFs. Correct system dynamics are maintained by including a derivative of load angular position (dδ/dt) feedforward term in the open-loop flux observer.

Referring now to FIG. 1, an open-loop flux observer circuit 10 according to the present invention is applied to a sensorless driver for an IPM machine 14 such as a motor or a generator. A field-oriented controller 18 receives a torque command Te* and synchronous reference frame feedback currents $I_{ds}^e$ and $I_{qs}^e$. The field-oriented controller 18 generates actual phase voltages 22 that are applied to inputs of the IPM machine 14.

Motor phase or stator terminal currents are measured and processed by a 3-phase to 2-phase transformation module 30. The outputs of the transformation module 30 are the stationary frame currents $I_{ds}^s$ and $I_{sq}^s$. The open-loop flux observer circuit 10 generates an estimated rotor angular position $\theta_r$ and angular speed $w_r$. A stationary to rotating frame transformation module 34 uses the estimated rotor angular position $\theta_r$ to generate synchronous reference frame feedback currents $I_{ds}^w$ and $I_{qs}^s$. The synchronous reference frame feedback currents $I_{ds}^s$ and $I_{qs}^s$ are output to the field-oriented controller module 18.

The open-loop flux observer circuit 10 processes the stationary frame currents $I_{ds}^s$ and $I_{qs}^s$ and stationary frame voltage commands $V_{ds}^{s*}$ and $V_{qs}^{s*}$ to generate the estimated rotor angular position $\theta_r$ and estimated rotor angular velocity $\Psi_\theta$. Note that in a synchronous machine, $\Psi_e = \omega_r$.

Figure 2:
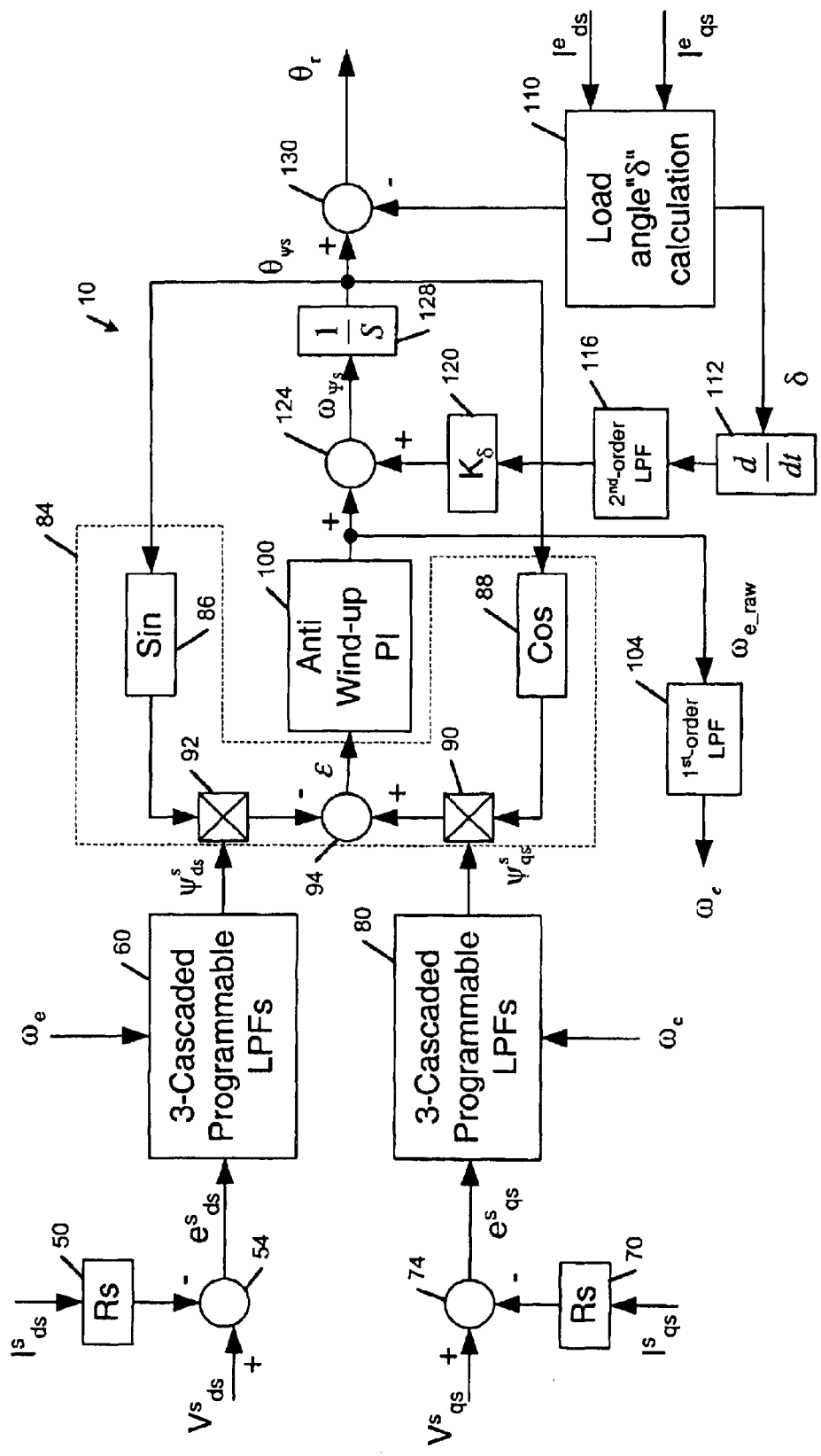
FIG. 2 is a more detailed functional block diagram of the open-loop observer of FIG. 1.

Referring now to FIG. 2, a detailed block diagram of the open-loop flux observer circuit 10 is shown. Stationary frame current $I_{ds}^s$ is multiplied by the stator resistance $R_s$ using gain block 50 to compute a d-axis stator resistance voltage drop. The output of gain block 50 is subtracted from the d-axis stator voltage command $V_{ds}^{s*}$ using a summer 54. The output of summer 54 is the d-axis back-EMF $\theta_{ds}^s$. The d-axis back-EMF is output to cascade LPFs 60, which use the electrical angular velocity $\Psi_e$ to determine the appropriate coefficients for the cascade LPFs 60. The cascade LPFs 60 integrate the d-axis back-EMF to obtain the d-axis stator flux linkage $\Psi_{ds}^s$.

Stationary frame current $I_{qs}^s$ is multiplied by the stator resistance using gain block 70 to compute the q-axis stator resistance voltage drop. The output of gain block 70 is subtracted from the q-axis stator voltage command $V_{qs}^{s*}$ using a summer 74. The output of summer 74 is the q-axis back EMF $e_{qs}^s$. The q-axis back EMF is passed to cascade LPFs 80, which use the electrical angular velocity $\omega_e$ to determine the appropriate coefficients for the cascade LPFs 80. The cascade LPFs 80 integrate the q-axis back EMF to obtain the q-axis stator flux linkage $\Psi_{qs}^s$.

A vector cross product calculator 84 calculates a vector cross product between the observer estimated stator flux angular position unit vector and the computed stator flux vector. Block 86 computes the sine of the estimated stator flux angular position $\theta_{\Psi s}$. Block 88 computes the cosine of the estimated stator flux angular position $\theta_{\Psi s}$. Multiplier 90 generates a product of the computed d-axis stator flux and the sine of the estimated stator flux angular position. Multiplier 92 generates a product of the computed q-axis stator flux and the cosine of the estimated stator flux angular position. Summing junction 94 subtracts the output of block (13) from the output of block (12) to generate the error signal ε.

The error signal ε is proportional to the angular position difference between the estimated stator flux angular position unit vector and the computed stator flux vector as can be seen in seen Equation 5 below:

$$\epsilon = (\cos\theta_{\Psi s} + j\sin\theta_{\Psi s}) \times \vec{\Psi}_{dqs} = |\Psi_s|\sin\theta_{error}$$

$$\epsilon \sim |\Psi_s| \cdot \theta_{error} \quad (5)$$

Error signal ε is input to anti-windup PI controller 100, whose output is $\omega_{e\_raw}$. The anti-windup PI controller 100 functions such that $\theta_{error}$ goes to zero. $\omega_{e\_raw}$ is passed through low pass filter 104 to produce the estimated electrical angular velocity $\omega_e$. This signal is also passed to cascade LPFs 60 and 80.

During load transients, the stator flux angular velocity does not equal the electrical angular velocity as can be seen in Equation 6 below:

$$\omega_{\Psi s} = \omega_e + \frac{d\delta}{dt} \quad (6)$$

The dδ/dt term can be used in feedforward manner in the open-loop flux observer to improve the torque transient response. The load angular position 6 is passed by a load angular position calculator 110 to a derivative generator 112. The output of derivative generator 112 is passed through low pass filter 116 to remove unwanted high frequency noise created by the derivative. The output of LPF 116 is scaled with gain block 120. The output of gain block 120 is summed with the output of the anti wind-up PI 100 via summing junction 124 to produce $\omega_{\psi_s}$, which is fed to integrator 128, which outputs the estimated stator flux position $\theta_{\psi_s}$. The load angular position $\delta$ is calculated by block 110 based on Equation 3 and subtracted from the stator flux position using summing junction 130 to obtain the final rotor position $\theta_r$, (see Equation 4).

Figure 3:
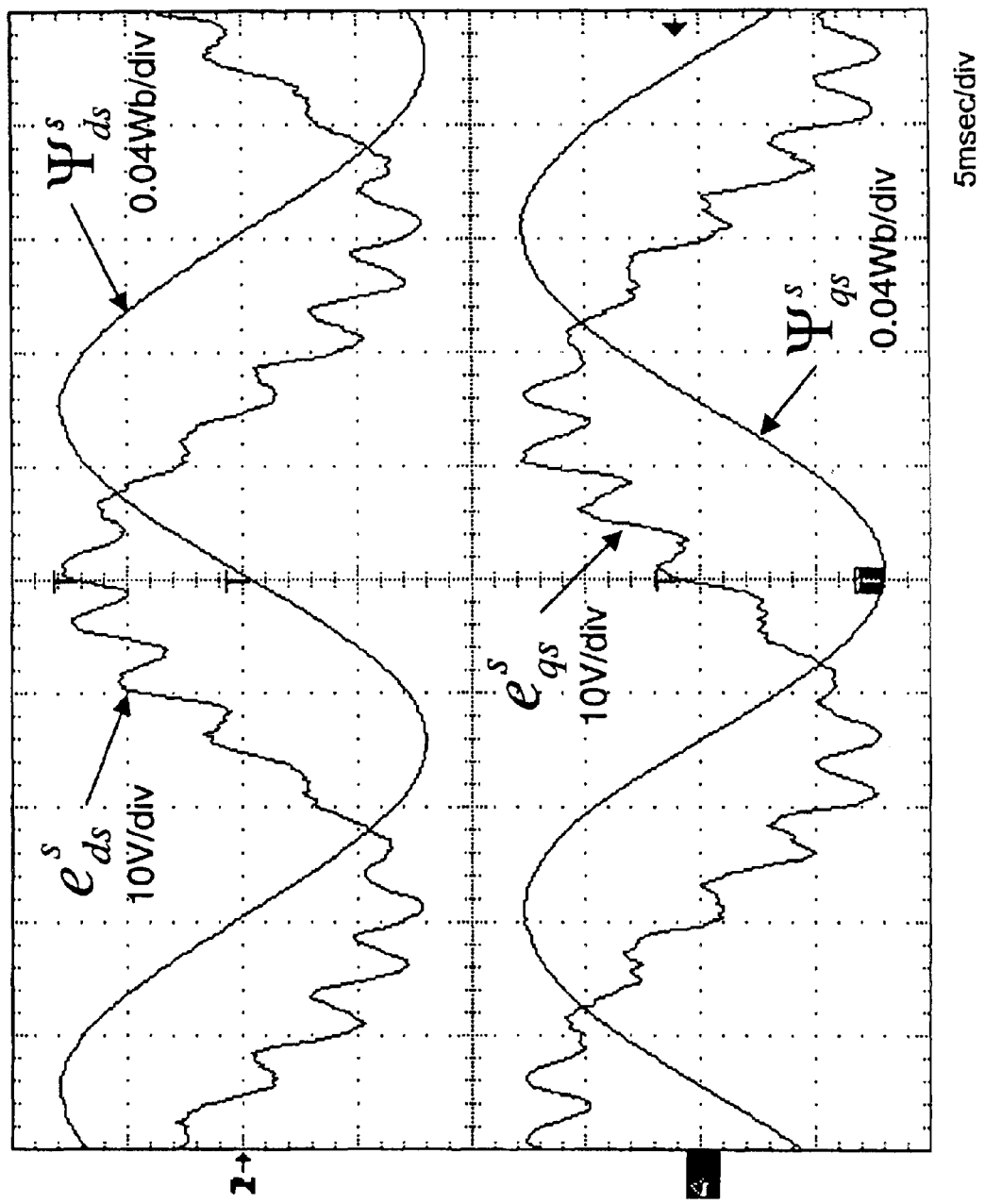
FIG. 3 is a plot illustrating d-axis and q-axis back EMF voltages.

The present invention was implemented and tested in the laboratory using a 75 kW interior permanent magnet motor. FIG. 3 shows the d-axis and q-axis back EMF voltages $\theta_{dqs}^s$ and resultant computed d and q-axis stator fluxes $\Psi_{dqs}^s$ as calculated by the cascade LPFs. In FIG. 3, $n_r$=500 rpm and T=50 Nm. The 90° of phase-shift introduced by the integration can be seen in the FIG. 3. The high frequency ripple on $\theta_{dqs}^s$ is inherent in the design of this IPM motor and is effectively filtered out during the integration process at this speed.

Figure 4:
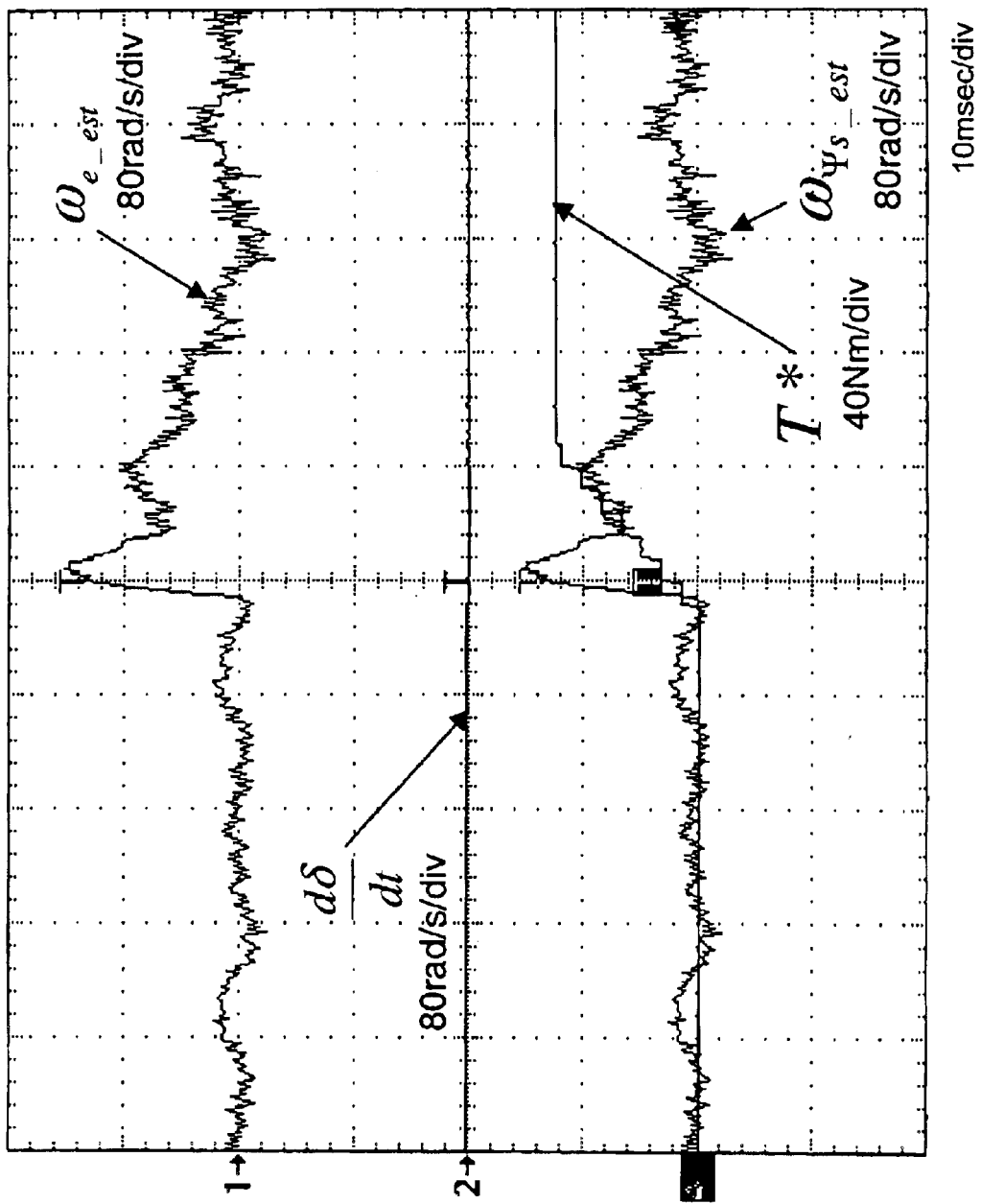
FIG. 4 is a plot illustrating the transient torque response without a feedforward term.

Referring now to FIG. 4, the torque transient response of the open-loop flux observer shown in FIG. 2 with $K_\delta$=0 (no d$\delta$/dt feedforward term). In FIG. 4, rotor speed $n_r$=500 rpm and T*=0→50 Nm at 3600 Nm/s. A step in $\omega_{e\_est}$ occurs, which should be constant. The dynamometer held the speed constant during the torque transient test. As can be seen in the FIG. 4, the estimated electrical speed has a large transient. In reality, the actual rotor speed was held constant, therefore the observer generated the error in the estimated electrical speed.

Figure 5:
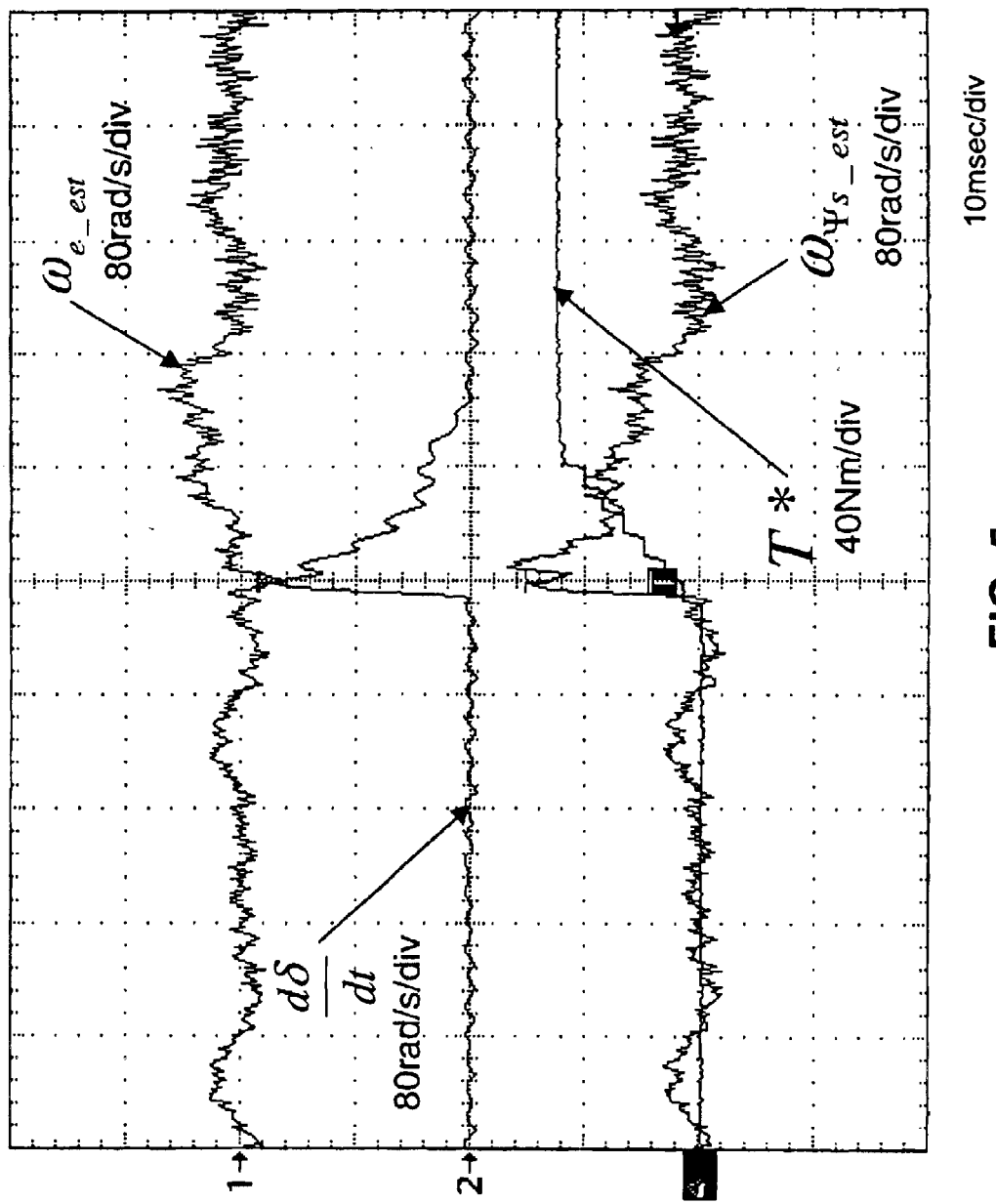
FIG. 5 is a plot illustrating the transient torque response with a feedforward term according to the present invention.

In FIG. 5, the test was repeated with $K_\delta$=1 (added d$\delta$/dt feedforward term per the present invention), a constant rotor speed $n_r$=500 rpm, and T*=0 →50 Nm at 3600 Nm/s. Notice $\omega_{e\_est}$ is now constant due to the d$\delta$/dt feedforward term. $\omega_{e\_est}$ has a temporary increase during torque transients, as explained by Equation 6.

In this case, it can be seen that the estimated electrical speed is constant. The estimated stator flux speed has a transient due to the d$\delta$/dt caused by changing load angular position (see Equation 6). These two figures clearly demonstrate the effectiveness of the present invention during torque transient.

Figure 6:
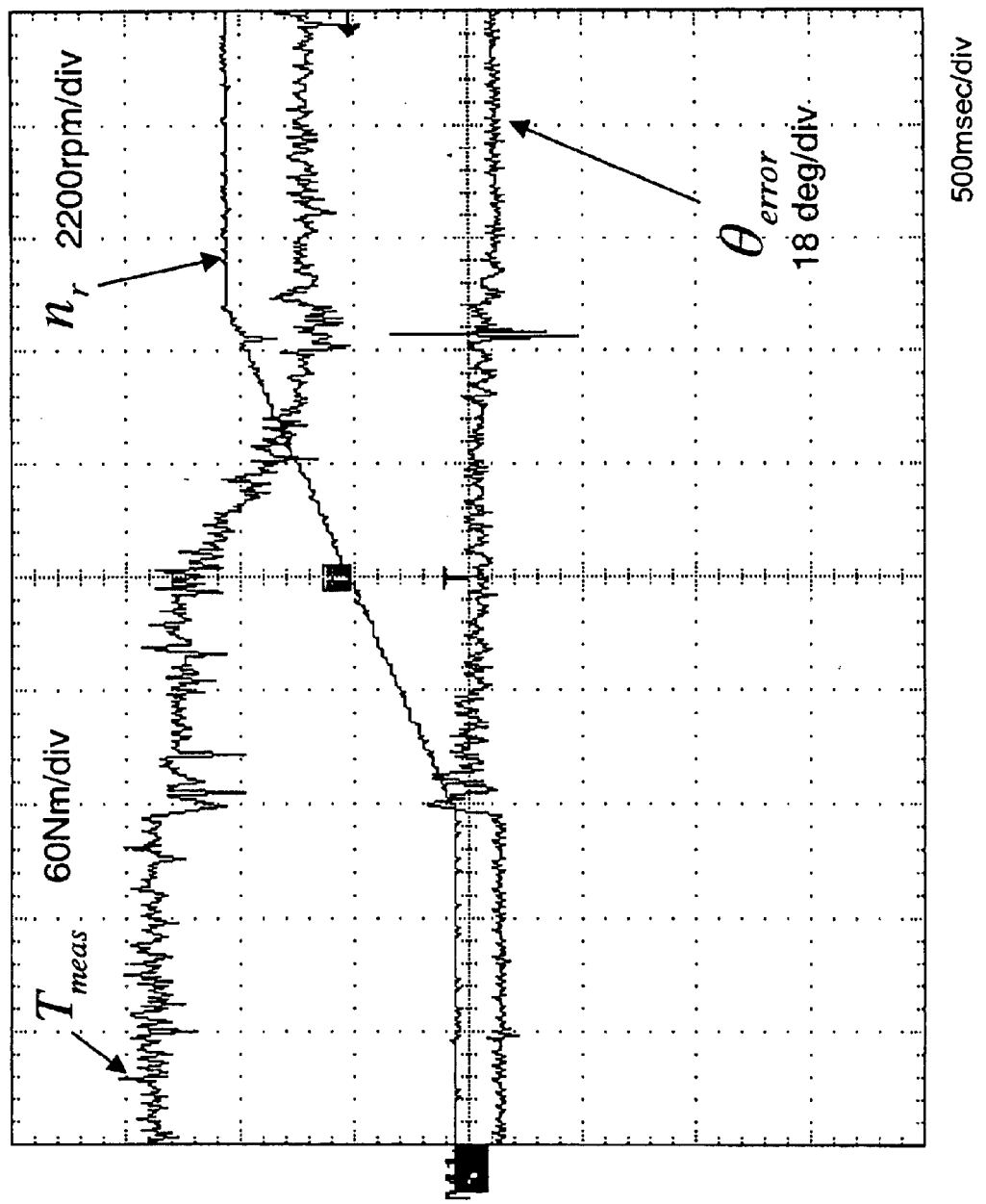
FIG. 6 is a plot illustrating transient performance during forward acceleration.
Figure 7:
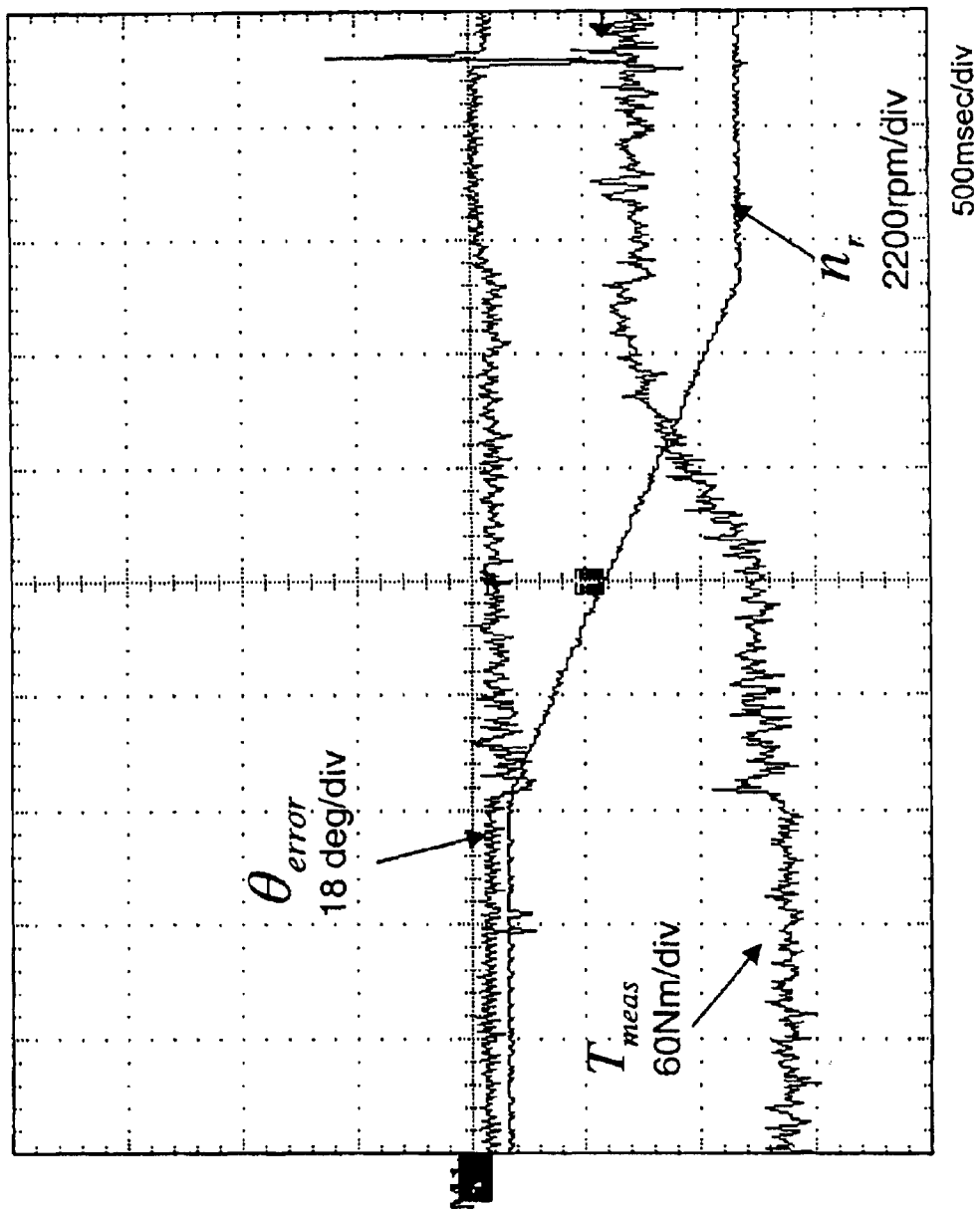
FIG. 7 is a plot illustrating transient performance during reverse acceleration.

Speed transient performance of the proposed open-loop flux observer is shown in FIGS. 6 and 7. FIG. 6 shows the forward direction acceleration with +180 Nm (100%) torque command (forward motoring), $N_r$=500→5000 rpm at 2000 rpm/sec acceleration rate, and T=+180 Nm. Torque is reduced at high speed due to field weakening. As speed increases, the torque is decreased due to field weakening operation of the control in the constant power region.

FIG. 7 shows the reverse direction acceleration with −180 Nm (−100%) torque command (reverse motoring), $N_r$=−500 →−5000 rpm at 2000 rpm/sec acceleration rate, and T=−180 Nm. Torque is reduced at high speed due to field weakening. From FIGS. 6 and 7, excellent performance of the open-loop flux observer according to the present invention is demonstrated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system that includes a field oriented controller that receives a torque command and that generates phase voltages for an electric machine including a rotor and a stator, comprising:
   a first transformation module that receives stator terminal currents from the electric machine and that generates d-axis and q-axis stationary frame currents;
   an open loop flux observer that receives d-axis and q-axis stationary frame voltage commands and an estimated rotor angular velocity and that includes:
      a vector cross product calculator that generates an error signal that is proportional to an angular difference between an estimated stator flux and a computed stator flux; and
      a proportional integral controller that generates an estimated rotor angular position based on said error signal; and
   a second transformation module that receives said d-axis and q-axis stationary frame currents, said estimated rotor angular position and said estimated rotor angular velocity and that generates d-axis and q-axis synchronous reference frame feedback currents that are output to the field oriented controller.

2. The control system of claim 1 wherein said electric machine is a permanent magnet electric machine.

3. The control system of claim 1 wherein said open loop flux observer includes:
   a d-axis voltage drop calculator that calculates a d-axis stator voltage drop due to a resistance of the stator;
   a q-axis voltage drop calculator that calculates a q-axis stator voltage drop due to said resistance;
   a first summer that generates a d-axis back EMF by calculating a first difference between said d-axis stationary frame voltage command and said d-axis stator voltage drop; and
   a second summer that generates a q-axis back EMF by calculating a second difference between said q-axis stationary frame voltage command and said q-axis stator voltage drop.

4. The control system of claim 3 wherein said open loop flux observer includes:
   a first low pass filter that receives an electrical angular velocity estimate and said d-axis back EMF and that generates a d-axis stator flux linkage value; and
   a second low pass filter that receives said electrical angular velocity estimate and said q-axis back EMF and that generates a q-axis stator flux linkage value.

5. The control system of claim 4 wherein said vector cross product calculator includes:
   a sine function generator that generates a sine value based on an estimated stator flux angular position;
   a cosine function generator that generates a cosine value based on said estimated stator flux angular position;
   a first multiplier that multiplies said sine value by said d-axis stator flux value to generate a first product;
   a second multiplier that multiplies said cosine value by said q-axis stator flux value to generate a second product; and
   a first difference circuit that generates an error signal that is based on a difference between said first product and said second product.

6. The control system of claim 1 further comprising a low pass filter that filters said estimated rotor angular velocity.

7. The control system of claim 1 wherein said open loop flux observer further includes:

a load angular position circuit that generates a load angular position;

a derivative calculator that calculates a derivative of said load angular position; and a summing circuit that generates a stator flux angular velocity by summing said load angular position derivative and said estimated electrical angular velocity.

8. The control system of claim 7 wherein said open loop flux observer further comprises an integrator that integrates said stator flux angular velocity to generate a stator flux position.

9. The control system of claim 8 further comprising a second difference circuit that generates said estimated angular rotor position based on a difference between said stator flux position and said load angular position.

10. An open loop flux observer for a permanent magnet electric machine, comprising:

a first back EMF calculator that calculates a d-axis back EMF;

a second back EMF calculator that calculates a q-axis back EMF;

a first low pass filter that receives said d-axis back EMF and an estimated electrical angular velocity and that generates a d-axis stator flux linkage;

a second low pass filter that receives said q-axis back EMF and said estimated electrical angular velocity and that generates a q-axis stator flux linkage;

a vector cross product calculator that receives said d-axis stator flux linkage and said q-axis stator flux linkage and that generates an error signal; and a proportional integral controller that generates an estimated rotor angular position based on said error signal.

11. The open loop flux observer of claim 10 wherein said d-axis back EMF calculator comprises:

a d-axis stator voltage drop calculator that calculates a d-axis stator voltage drop due to stator resistance; and a first summer that generates said d-axis back EMF by generating a first difference between said d-axis stationary frame voltage command and said d-axis stator voltage drop.

12. The open loop flux observer of claim 11 wherein said q-axis back EMF calculator comprises:

a q-axis stator voltage drop calculator that calculates a q-axis stator voltage drop due to said stator resistance; and a second summer that generates said q-axis back EMF by generating a second difference between said q-axis stationary frame voltage command and said q-axis stator voltage drop.

13. The open loop flux observer of claim 10 wherein said vector cross product calculator includes:

a sine function generator that generates a sine value based on an estimated stator flux angular position;

a cosine function generator that generates a cosine value based on said estimated stator flux angular position;

a first multiplier that multiplies said sine value by said d-axis stator flux value to generate a first product;

a second multiplier that multiplies said cosine value by said q-axis stator flux value to generate a second product; and a difference circuit that generates an error signal that is based on a difference between said first product and said second product.

14. The open loop flux observer of claim 13 further comprising a low pass filter that filters said estimated electrical angular velocity.

15. The open loop flux observer of claim 10 further comprising a load transient compensating circuit.

16. The open loop flux observer of claim 15 wherein said load transient compensating circuit includes:

a load angular position circuit that generates a load angular position;

a derivative calculator that calculates a derivative of said load angular position; and a summing circuit that generates a stator flux angular velocity by summing of said load angular position derivative and said estimated electrical angular velocity.

17. The open loop flux observer of claim 16 wherein said open loop flux observer further comprises an integrator that integrates said stator flux angular velocity to generate a stator flux position.

18. The open loop flux observer of claim 17 further comprising a difference circuit that generates said estimated angular rotor position based on a difference between said stator flux position and said load angular position.

* * * * *